(12) United States Patent
Yu et al.

(10) Patent No.: US 11,239,541 B2
(45) Date of Patent: Feb. 1, 2022

(54) RADAR BRACKET WITH SURFACE SELF-ADAPTIVENESS

(71) Applicants: YANFENG PLASTIC OMNIUM AUTOMOTIVE EXTERIOR SYSTEMS CO., LTD., Shanghai (CN); COMPAGNIE PLASTIC OMNIUM SE, Lyons (FR)

(72) Inventors: Xia Yu, Shanghai (CN); Quanquan Kong, Shanghai (CN)

(73) Assignees: YANFENG PLASTIC OMNIUM AUTOMOTIVE EXTERIOR SYSTEMS CO., LTD., Shanghai (CN); COMPAGNIE PLASTIC OMNIUM SE, Lyons (FR)

( * ) Notice: Subject to any disclaimer, the term of this patent is extended or adjusted under 35 U.S.C. 154(b) by 0 days.

(21) Appl. No.: 16/726,873

(22) Filed: Dec. 25, 2019

(65) Prior Publication Data

US 2021/0083357 A1 Mar. 18, 2021

(30) Foreign Application Priority Data

Sep. 17, 2019 (CN) .......................... 201921543094.1

(51) Int. Cl.
*H01Q 1/12* (2006.01)
*H01Q 1/32* (2006.01)

(52) U.S. Cl.
CPC ............. *H01Q 1/12* (2013.01); *H01Q 1/3233* (2013.01)

(58) Field of Classification Search
CPC .......... H01Q 1/12; H01Q 1/3233; H01Q 1/18; H01Q 1/20; H01Q 1/32
See application file for complete search history.

(56) References Cited

U.S. PATENT DOCUMENTS

| 1,603,954 A | * | 10/1926 | Huston | ................... | A47F 7/285 |
| | | | | | 248/146 |
| 6,227,501 B1 | | 5/2001 | Malcolm | | |

(Continued)

FOREIGN PATENT DOCUMENTS

DE 112012005811 B4 7/2016
EP 3101442 A1 12/2016
(Continued)

OTHER PUBLICATIONS

Extended European Search Report in European Application No. 19219685.5 dated Aug. 18, 2020, 9 pages.

*Primary Examiner* — Anita M King
(74) *Attorney, Agent, or Firm* — Metis IP LLC

(57) ABSTRACT

The invention provides a radar bracket with self-adaptiveness to a curved surface. The radar bracket comprises: a bracket body provided with a radar mounting part; and, a bracket flanging configured to be fixed to a skin and being arranged at a periphery of the bracket body. The bracket flanging is provided with a plurality of weakened structures for providing its self-adaptiveness to a curved surface. When the radar bracket is to be bonded or welded to a skin, thanks to the bracket flanging's ability of easily deform to adapt to different curved surfaces, the same radar bracket can be attached to different positions of the skin with different curvatures. According to the invention, it is provided a radar bracket with self-adaptiveness to a curved surface that can be used universally all over an assembled automobile, hence the production costs, the mounting costs, and the probability of erroneous mounting are greatly reduced.

11 Claims, 6 Drawing Sheets

(56) References Cited

U.S. PATENT DOCUMENTS

| | | | | |
|---|---|---|---|---|
| 9,446,727 B2 * | 9/2016 | Davis | ............... | B60R 19/483 |
| 2004/0241367 A1 * | 12/2004 | Johnson | ............ | B29C 44/04 |
| | | | | 428/36.5 |
| 2018/0345616 A1 * | 12/2018 | Matlack | ......... | B29C 33/0011 |

FOREIGN PATENT DOCUMENTS

| | | | |
|---|---|---|---|
| JP | 2013086616 A | | 5/2013 |
| JP | 2013221880 A | | 10/2013 |
| JP | 2016008923 A | | 1/2016 |
| WO | 2014073108 A1 | | 5/2014 |

\* cited by examiner

RADAR BRACKET WITH SURFACE SELF-ADAPTIVENESS

CROSS-REFERENCE TO RELATED APPLICATION

This application claims priority to Chinese Patent Application No. 201921543094.1, filed on Sep. 17, 2019, the contents of which are incorporated herein by reference in their entirety.

TECHNICAL FIELD

The invention relates to the field of radar bracket, and more particularly, to a radar bracket capable of self-adapting to a curved surface.

BACKGROUND

Radars are a means of assisting driving, reversing, or parking, and are used more and more in current automobile models. There are also an increasing number and more and more types of radar brackets, which serve as a carrier that connects a radar to a skin. The more functionality is equipped with an automobile model, the more radars there are, which means there are numerous radar brackets. This results in an important workload for the design phase, the project development phase, and the final component management. Therefore, the technical drawbacks currently existing are mainly: first, as various radar brackets need to be produced to adapt to the mounting of the same type radar at different positions, production costs are high; second, as whether the type of a radar bracket matches a position needs to be identified, which is time consuming and labor consuming, mounting costs are high; third, even though whether the type of a radar bracket matches a position is identified, the risk of erroneous mounting still exists.

SUMMARY

An objective of the invention is to provide a radar bracket capable of self-adapting to a curved surface, thus solving the problem in the prior art that radar brackets cannot be used universally all over an assembled automobile, which in turn results in various types of radar brackets, high production costs, high mounting costs, and the existence of the risk of erroneous mounting.

To solve the above-described technical problems, the invention adopts the following technical solution:

A radar bracket capable of self-adapting to a curved surface is provided. The radar bracket comprises: a bracket body provided with a radar mounting part; and, a bracket flanging configured to be fixed to a skin and being arranged at a periphery of the bracket body. The bracket flanging is provided with a plurality of weakened structures for providing its self-adaptiveness to a curved surface.

Preferably, the weakened structures are slits formed by a hollowing-out operation.

Preferably, the slits are formed at a junction between the bracket flanging and the bracket body.

Preferably, the slits extend from a junction between the bracket flanging and the bracket body to a periphery of the bracket flanging.

Preferably, the slits extend from a periphery of the bracket flanging to a central area of the bracket flanging.

Preferably, the weakened structures are notches formed at a periphery of the bracket flanging by a hollowing-out operation.

Preferably, the bracket flanging is fixed to the skin by adhesive bonding or welding.

Preferably, the bracket flanging is in a curved sheet-like structure, and its curvature can be easily modified under an action of external force so as to adapt to a curvature of the skin.

With the radar bracket capable of self-adapting to a curved surface provided by the invention, when the radar bracket is to be adhesively bonded or welded to a skin, it can easily deform to adapt to a curved surface of a counterpart by means of local surface self-adaptive structures of the bracket flanging. Therefore, the radar bracket can be attached to different positions with different curvatures of the skin, thereby achieving the objective that the radar bracket can be universally used all over an assembled automobile.

Therefore, the radar bracket provided by the invention can achieve the following functions: mounting integration of a same type radar by means of the radar bracket at different regions of a same automobile model; mounting integration of a same type radar by means of the radar bracket at different regions of a different automobile model.

In summary, the invention provides a radar bracket with self-adaptiveness to a curved surface, which can be used universally all over an assembled automobile. Thanks to the radar bracket, the production costs, the mounting costs, and the probability of erroneous mounting are greatly reduced.

DETAILED DESCRIPTION

The invention will be described further below in reference to specific embodiments. It should be understood that the following embodiments are used merely to describe the invention and not to limit the scope of the invention.

Figure 1:
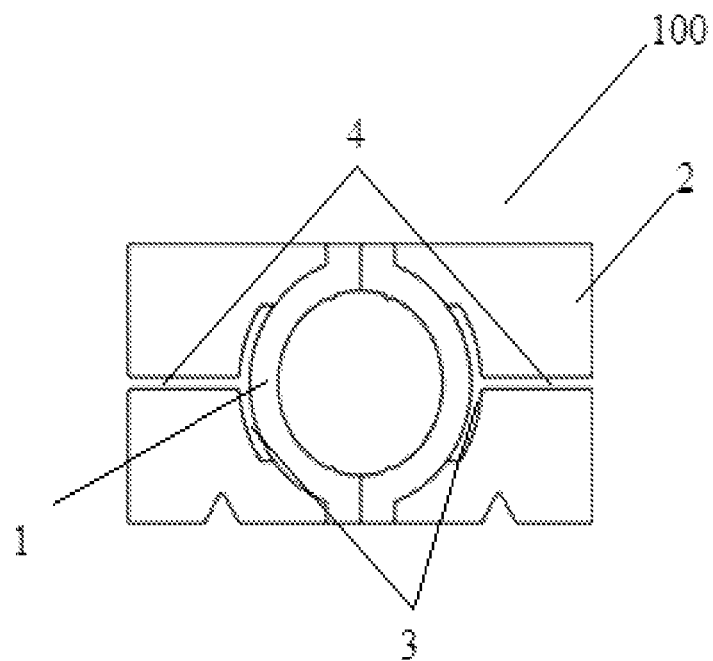
FIG. 1 is a plan view of a radar bracket provided according to a preferred embodiment of the invention.
Figure 2:
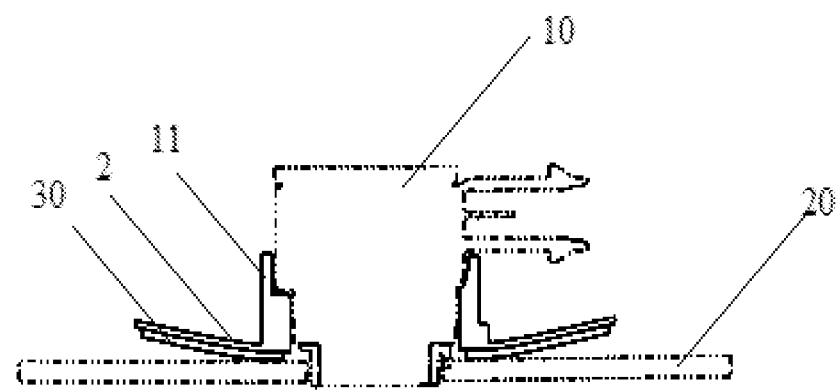
FIG. 2 is a structural diagram of the radar bracket shown in FIG. 1 before being mounted to a skin.
Figure 3:
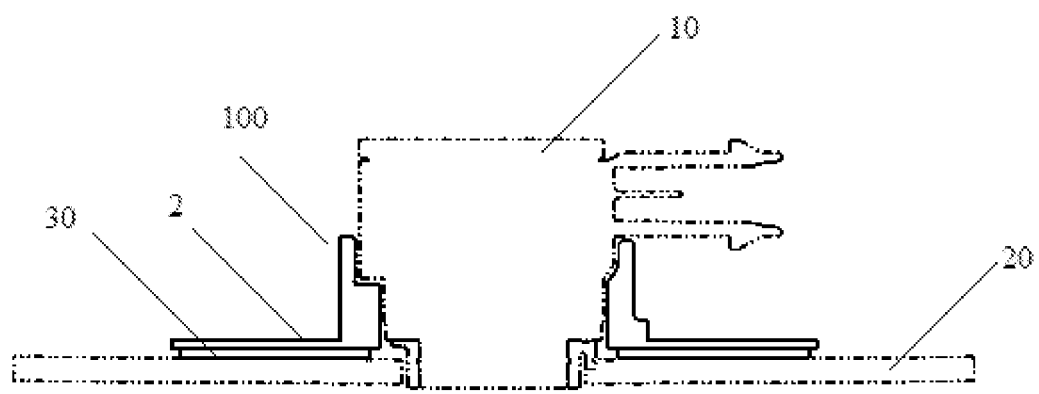
FIG. 3 is a structural diagram of the radar bracket as shown in FIG. 1 after being mounted to a skin.

In reference to FIG. 1 to FIG. 3, a radar bracket 100 provided according to a preferred embodiment of the invention is shown. The radar bracket 100 comprises: a bracket body 1, and a bracket flanging 2. The bracket body 1 is provided with a radar mounting part 11 for mounting a radar 10. The bracket flanging 2 is provided at the periphery of the bracket body 1, and is configured to being fixed with a skin 20 by adhesive bonding. The bracket flanging 2 is provided with a plurality of weakened structures to provide self-adaptability to a curved surface, that is, the ability of easily deform to adapt to various curved skins.

According to this preferred embodiment, the weakened structure is a slit formed by a hollowing-out operation. The slit comprises: a first slit structure 3 extending along the junction between the bracket flanging 2 and the bracket body 1. The first slit structure 3 is arranged symmetrically on both sides, left and right, of the bracket flanging 2, and extends a certain degree of curvature along the circumference of the joint between the bracket body 1 and the bracket flanging 2 respectively.

According to this preferred embodiment, the slit further comprises: a second slit structure 4 extending from the midpoint of the first slit structure 3 to an outer periphery of the bracket flanging 2. The second slit structure 4 is arranged symmetrically on both sides, left and right, of the bracket flanging 2, and extends respectively along a straight line.

According to this preferred embodiment, the bracket flanging 2 is in a curved sheet-like structure, and its curvature can be easily modified under an action of external force so as to adapt to a curvature of the skin 20.

The process of mounting with the radar bracket 100 provided by this preferred embodiment is as follows:

First, the radar 10 is mounted to the bracket body 1 by means of the radar mounting part 11, and then an adhesive tape 30 is adhered to the bottom of the bracket flanging 2, at this time, as shown in FIG. 2, the bracket flanging 2 is in a tilted state;

Next, because the bracket flanging 2 itself has the ability of self-adapting to a curved surface, the bracket flanging 2 can easily deform. Therefore, the radar bracket 100 mounted with the radar 10 can be bonded as a whole to a skin 20 by means of the adhesive tape 30. As shown in FIG. 3, even if the curvature of the skin 20 is different at different positions, the radar bracket 100 can still be mounted properly.

Figure 4:
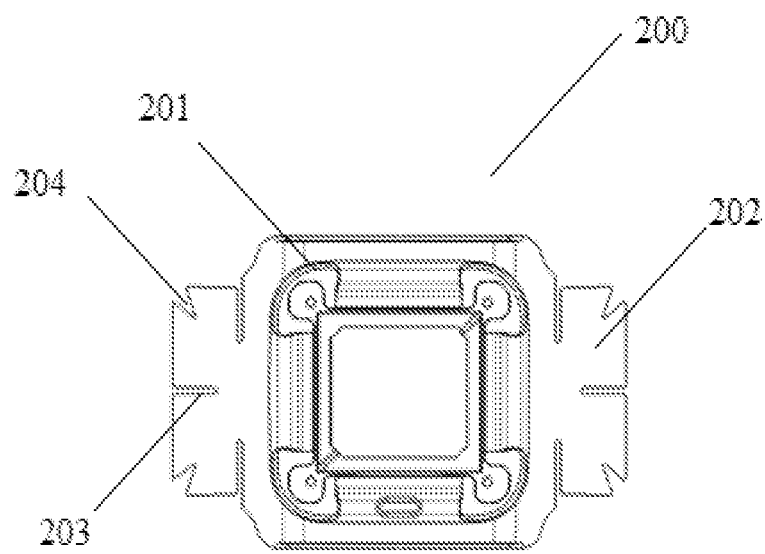
FIG. 4 is a plan view of a radar bracket provided according to another preferred embodiment of the invention.
Figure 5:
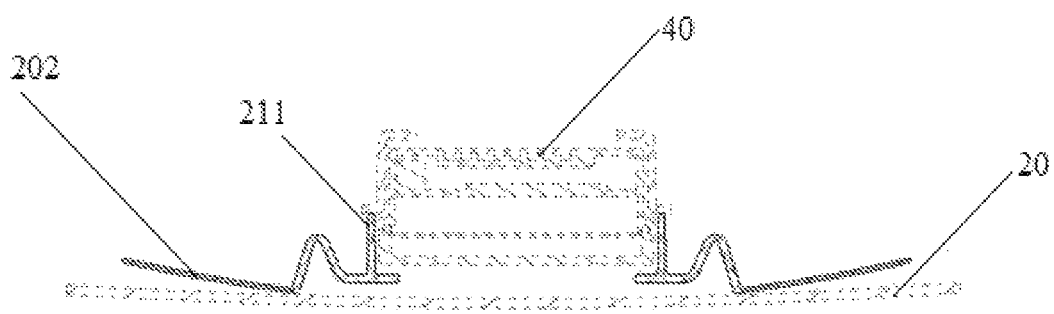
FIG. 5 is a structural diagram of the radar bracket as shown in FIG. 4 before being mounted to a skin.
Figure 6:
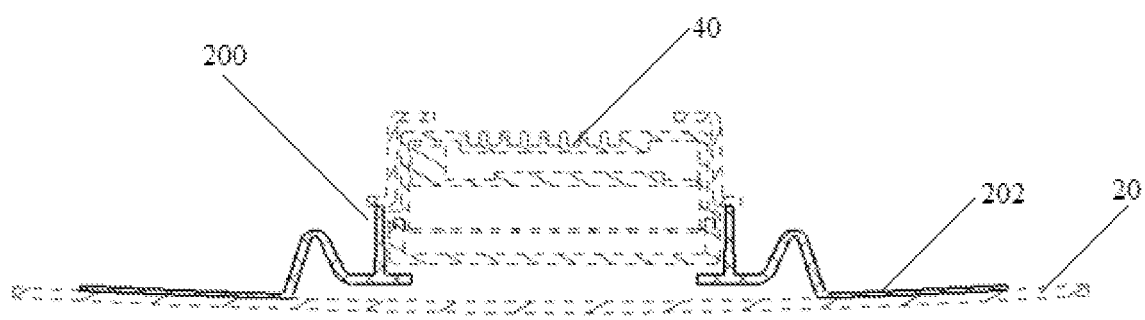
FIG. 6 is a structural diagram of the radar bracket as shown in FIG. 4 after being mounted to a skin.

In reference to FIG. 4 to FIG. 6, a radar bracket 200 provided according to another preferred embodiment of the invention is shown. The radar bracket 200 is configured for mounting a radar 40, and comprises: a bracket body 201, and a bracket flanging 202. The bracket body 201 is provided with a radar mounting part 211 for mounting the radar 40. The bracket flanging 202 is arranged at the periphery of the bracket body 201, and is configured to be fixed on a skin 20 by welding. The bracket flanging 202 is provided with a plurality of weakened structures to provide its self-adaptation to a curved surface, that is, the ability of easily deform to adapt to various curved skins.

According to this preferred embodiment, the weakened structure comprises: slits and notches formed by a pierced operation. The slits comprise a third slit structure 203 extending from the outer periphery of the bracket flanging 202 to the central area of the bracket flanging 202. The notches comprise a V-shaped notch 204 formed by a hollowing-out operation at the edge of the outer periphery of the bracket flanging 202.

It should be understood that the notches are not limited to V-shape, and can be of any other appropriate form such as a U-shape.

The process of mounting with the radar bracket 200 provided by this preferred embodiment is as follows:

First, the radar 40 is mounted to the bracket body 201 by means of the radar mounting part 211, at that time, as shown in FIG. 5, the bracket flanging 202 is in a tilted state;

Next, because the bracket flanging 202 itself has the ability of self-adapting to a curved surface, the bracket flanging 202 can easily deform. Therefore, the radar bracket 200 mounted with the radar 40 can be bonded as a whole to a skin 20 by welding. As shown in FIG. 6, even if the curvature of the skin 20 is different at different positions, the radar bracket 200 can still be mounted properly.

What has been described are merely preferred embodiments of the invention, and are not intended to limit the scope of the invention. The embodiments of the invention described above can be subject to various modifications. All simple, equivalent changes and embellishments made according to the claims and the contents of the specification of the present invention application fall within the scope of protection of the invention. What has not been described in detail in the invention is conventional technologies.

We claim:

1. A radar bracket capable of self-adapting to a curved surface, characterized in that, the radar bracket comprises:
    a bracket body provided with a radar mounting part; and,
    a bracket flanging configured to be fixed to a skin and being arranged at a periphery of the bracket body,
    wherein the bracket flanging is provided with a plurality of weakened structures for providing its self-adaptiveness to the curved surface;
    wherein the weakened structures are slits and/or notches and include a first slit structure formed by a hollowing-out operation and extending along a circumference of a junction between the bracket flanging and the bracket body.

2. The radar bracket according to claim 1, wherein the slits are formed at the junction between the bracket flanging and the bracket body.

3. The radar bracket according to claim 1, wherein the slits extend from a junction between the bracket flanging and the bracket body to a periphery of the bracket flanging.

4. The radar bracket according to claim 1, wherein the slits extend from a periphery of the bracket flanging to a central area of the bracket flanging.

5. The radar bracket according to claim 1, wherein the notches are formed at a periphery of the bracket flanging by a hollowing-out operation.

6. The radar bracket according to claim 1, wherein the bracket flanging is fixed to the skin by adhesive bonding or welding.

7. The radar bracket according to claim 1, wherein the bracket flanging is in a curved sheet-like structure, and its curvature can be easily modified under an action of external force so as to adapt to a curvature of the skin.

8. The radar bracket according to claim 1, wherein the first slit structure extends a certain degree of curvature along the circumference of the junction between the bracket flanging and the bracket body.

9. The radar bracket according to claim 8, wherein the first slit structure is arranged symmetrically on both sides of the bracket flanging.

10. The radar bracket according to claim 1, wherein the weakened structures include a second slit structure extending from the midpoint of the first slit structure to a periphery of the bracket flanging.

11. The radar bracket according to claim 10, wherein the second slit structure is arranged symmetrically on both sides of the bracket flanging and extends respectively along a straight line.

* * * * *

UNITED STATES PATENT AND TRADEMARK OFFICE
CERTIFICATE OF CORRECTION

Page 1 of 1

PATENT NO. : 11,239,541 B2
APPLICATION NO. : 16/726873
DATED : February 1, 2022
INVENTOR(S) : Xia Yu et al.

It is certified that error appears in the above-identified patent and that said Letters Patent is hereby corrected as shown below:

On the Title Page

Item (71), Lines 4 to 5, "COMPAGNIE PLASTIC OMNIUM SE, Lyons (FR)" should read
-- COMPAGNIE PLASTIC OMNIUM SE, Lyon (FR) --.

Item (73), Lines 4 to 5, "COMPAGNIE PLASTIC OMNIUM SE, Lyons (FR)" should read
-- COMPAGNIE PLASTIC OMNIUM SE, Lyon (FR) --.

Signed and Sealed this
Twenty-second Day of March, 2022

Drew Hirshfeld
*Performing the Functions and Duties of the
Under Secretary of Commerce for Intellectual Property and
Director of the United States Patent and Trademark Office*